United States Patent [19]

Grills et al.

[11] Patent Number: 5,056,678
[45] Date of Patent: Oct. 15, 1991

[54] ACCESS PORT SEALING DEVICE

[75] Inventors: Laurence M. Grills, Mission Viejo; Donald L. Morrison, Anaheim; Charles Saxton, Jr., Torrance; Reuven Stein, Laguna Beach, all of Calif.

[73] Assignee: Kaiser Aerospace and Electronics Corporation, Foster City, Calif.

[21] Appl. No.: 536,307

[22] Filed: Jun. 11, 1990

[51] Int. Cl.$^5$ .............................................. B65D 53/00
[52] U.S. Cl. ................................... 220/238; 220/234; 220/259; 220/344; 251/99; 251/114; 251/299
[58] Field of Search ............... 220/234, 238, 259, 314, 220/318, 342, 343, 344, 244; 251/298, 299, 95, 99, 114–116

[56] References Cited

U.S. PATENT DOCUMENTS

| | | | |
|---|---|---|---|
| 1,737,123 | 11/1929 | Page, Jr. | 251/299 |
| 3,010,694 | 11/1961 | Lynch | 251/189 |
| 4,098,427 | 7/1978 | Duckworth, Jr. | 220/259 |
| 4,127,215 | 11/1978 | Morrison | 220/314 |
| 4,145,259 | 3/1979 | Leumann | 202/248 |
| 4,188,675 | 2/1980 | Ast | 4/295 |
| 4,567,994 | 2/1986 | Hofmann | 220/234 |
| 4,690,296 | 9/1987 | Elliott | 220/259 |

Primary Examiner—Stephen Marcus
Assistant Examiner—Stephen Cronin
Attorney, Agent, or Firm—Marvin H. Kleinberg

[57] ABSTRACT

An access port cover is fitted with a sealing plug that is adapted to fit inside a conduit to provide an occluding seal. The conduit is also fitted with an inner flap that is automatically closed and latched when the cover is closed and latched. In a preferred embodiment, a ridge in the inner wall of the conduit cooperates with a support plate to compress the plug between the cover and the plate, extruding the plug radially into sealing engagement with the inner wall of the conduit.

21 Claims, 3 Drawing Sheets

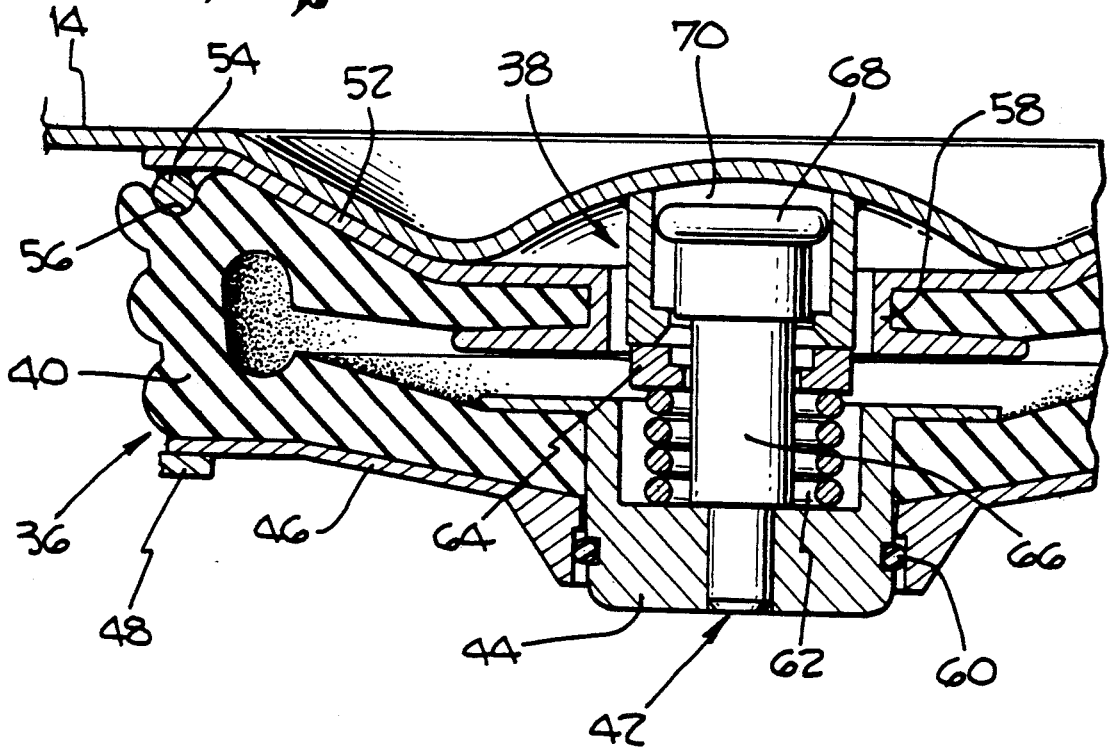
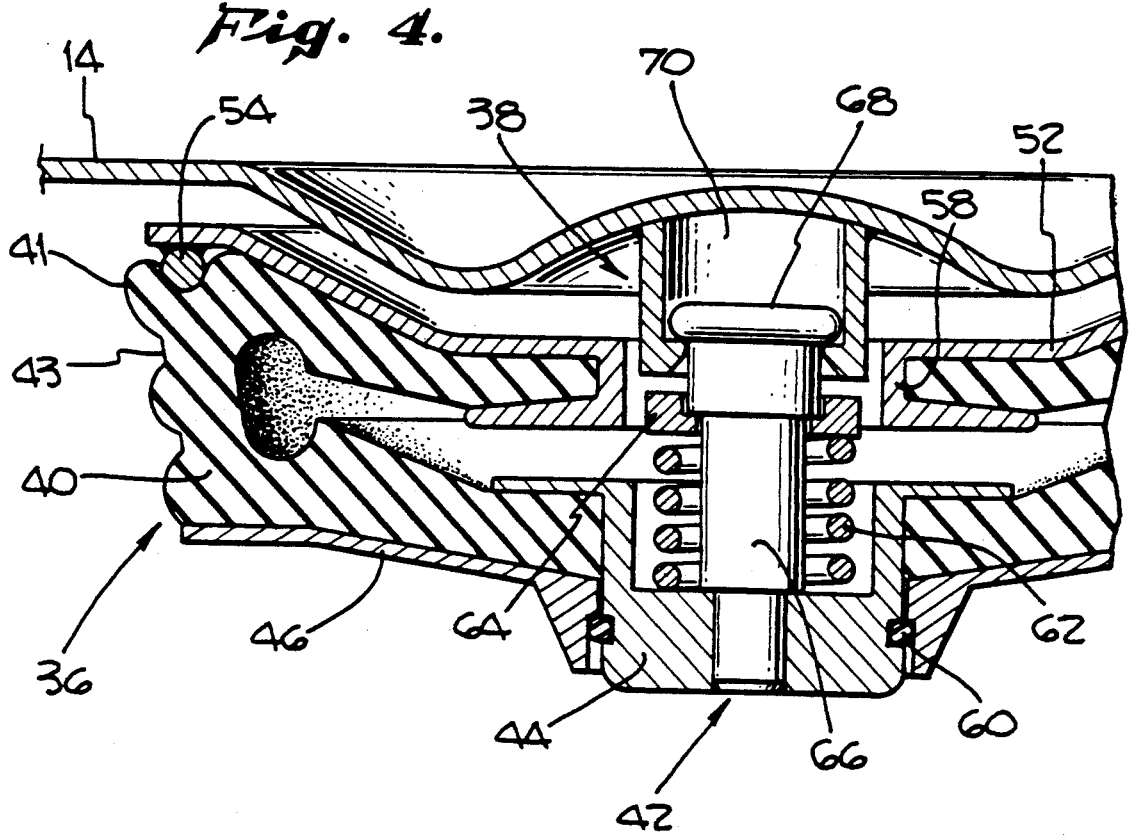

ACCESS PORT SEALING DEVICE

BACKGROUND OF THE INVENTION

The present invention relates to access port covering devices, and, more particularly, to an improved port covers device which includes an integral sealing member.

On modern aircraft, various access ports are provided for servicing the aircraft. In some instances, the system being serviced may leak fluids which, if permitted to escape, can freeze on the aircraft surfaces during flight. These frozen accretions can break away and may fall to earth as potentially dangerous projectiles or, what is worse, can be ingested by an aircraft engine or damage other structural parts of the aircraft.

This problem has arisen in connection with the aircraft human waste system, which includes an onboard storage tank that accumulates the lavatory waste products during flight and which is drained and cleaned by ground based service personnel. Prior art attempts at preventing leakage included the patent to W. B. Lynch, U.S. Pat. No. 3,010,694, which disclosed a removable plug and coupling assembly that provided a fluid tight seal at the servicing outlet port.

Because ground service personnel sometimes failed to replace the plug, an improved port covering device was disclosed in U.S. Pat. No. 4,127,215, to Donald L. Morrison, (assigned to the assignee of the present invention) which would not close unless the plug was in place. An improved, lightweight plug for the conduit was disclosed in U.S. Pat. No. 4,188,675 to Herbert H. Ast, (assigned to the assignee of the present invention).

In an effort to supplant the plug completely, double "flap" sealing devices were tried. One, shown in U.S. Pat. No. 4,098,427, to Milton Donald Duckworth teaches a pair of sealing doors, one of which caps the outer end of the conduit and the other of which seats against an annular flange on the interior of the conduit. An improvement over Duckworth, which permitted an unobstructed flow was disclosed in the patent to Gregory T. Elliott, U.S. Pat. No. 4,690,296, (assigned to the assignee of the present invention).

However, even the best efforts of the prior art are somehow defeated by airline servicing personnel who abuse the seals and the operating mechanisms so that even the Elliott combination occasionally experienced fluid leakage during a flight. The problem seemed to stem from some leakage from the interior which could not be retained by the seals carried on the outer door that seat against the edges of the conduit, and which are invariably damaged during servicing.

SUMMARY OF THE INVENTION

Recognizing that edge seals are susceptible to leakage in the presence of foreign matter at the edges of the conduits or damage to the conduit, what is needed is an element that will sealingly occlude the conduit interior in a manner similar to that of the sealing plugs of Lynch and Ast, supra. According to the present invention, a device that satisfies that need combines the plunger assembly 40 of Elliott, supra, with a sealing plug similar to that of Ast, which expands to occludingly seal the interior of the conduit when compressed between an exterior latching cover and the exterior of an inner conduit closure.

In a preferred embodiment of the present invention, the plug is loosely mounted on the latching cover. The conduit is provided with a converging taper from the outer edge to assist in the proper seating of the plug. An elastomeric torus having a plurality of convoluted sealing lands forms the exterior of the plug and, when compressed between the inner closure and the latching cover, expands radially outward to fill the interior of the conduit into which it has been inserted.

In alternative embodiments, expansion mechanisms can be provided which, in a manner similar to Lynch and Ast, forces the circumferential surface of the torus into sealing engagement with the inner wall of the conduit.

In operation, a latching handle is released and the plug removed so that a drain coupling/hose can be attached to the outlet port. An externally operated lever opens the inner closure and a waste tank drain valve is operated to empty and service the waste tank. When the tank is drained and the servicing is completed, the drain coupling/hose is removed.

The sealing plug, which is loosely mounted or gimballed on the latching cover seats itself in the conduit as the latching handle is secured. The sealing plug also engages the inner closure and latches it by forcing it against its seals until a spring loaded latch is engaged.

The latching handle engages a rod and exerts the closing force which latches the inner closure and which compresses and extrudes the sealing plug radially outward until it fills the interior space with a fluid tight seal.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 is a composite cross section view of the assembly of FIG. 2, shown in the open configuration;

FIG. 4 is a composite cross section view of the assembly of FIG. 2, shown in the closed configuration;

DESCRIPTION OF THE PREFERRED EMBODIMENT

Figure 1:
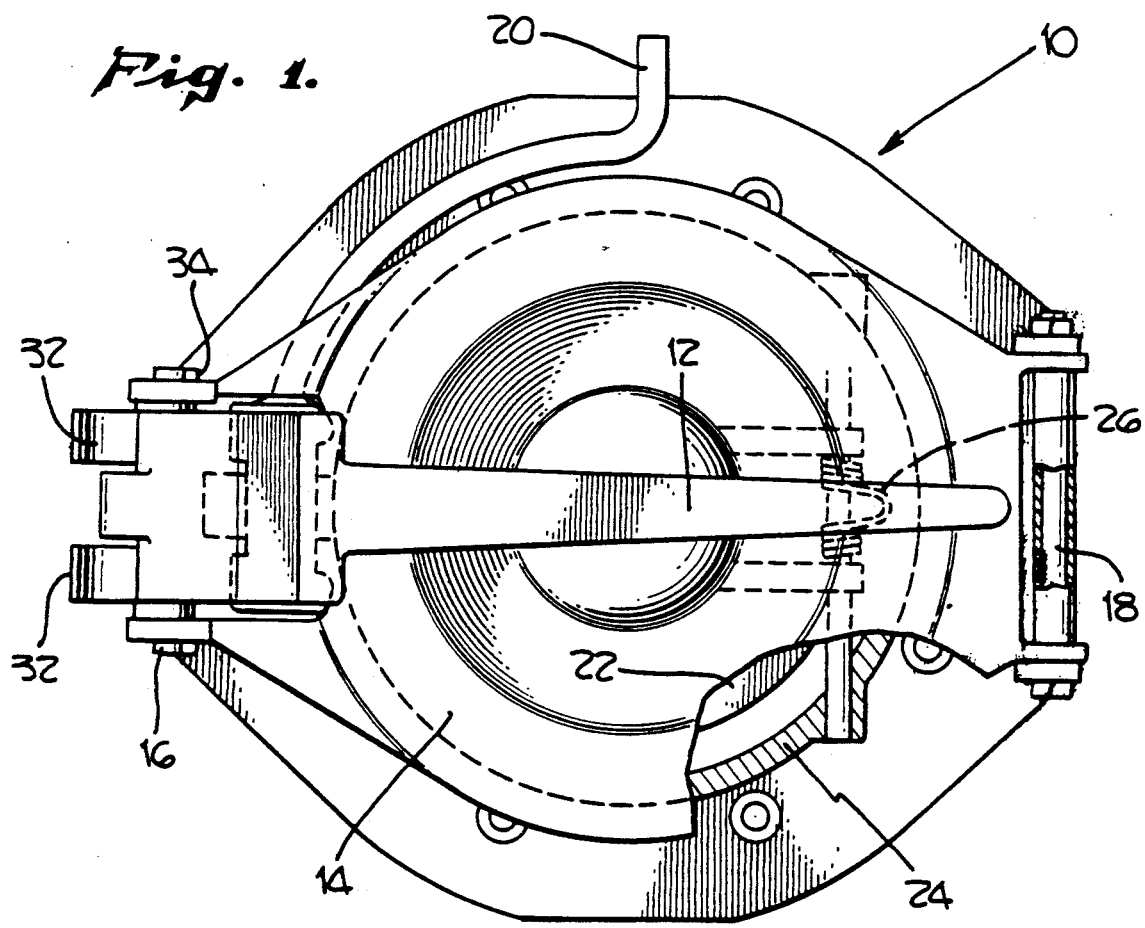
FIG. 1 is a top view of a lavatory drain service assembly for aircraft which includes a sealing device according to the present invention.
Figure 2:
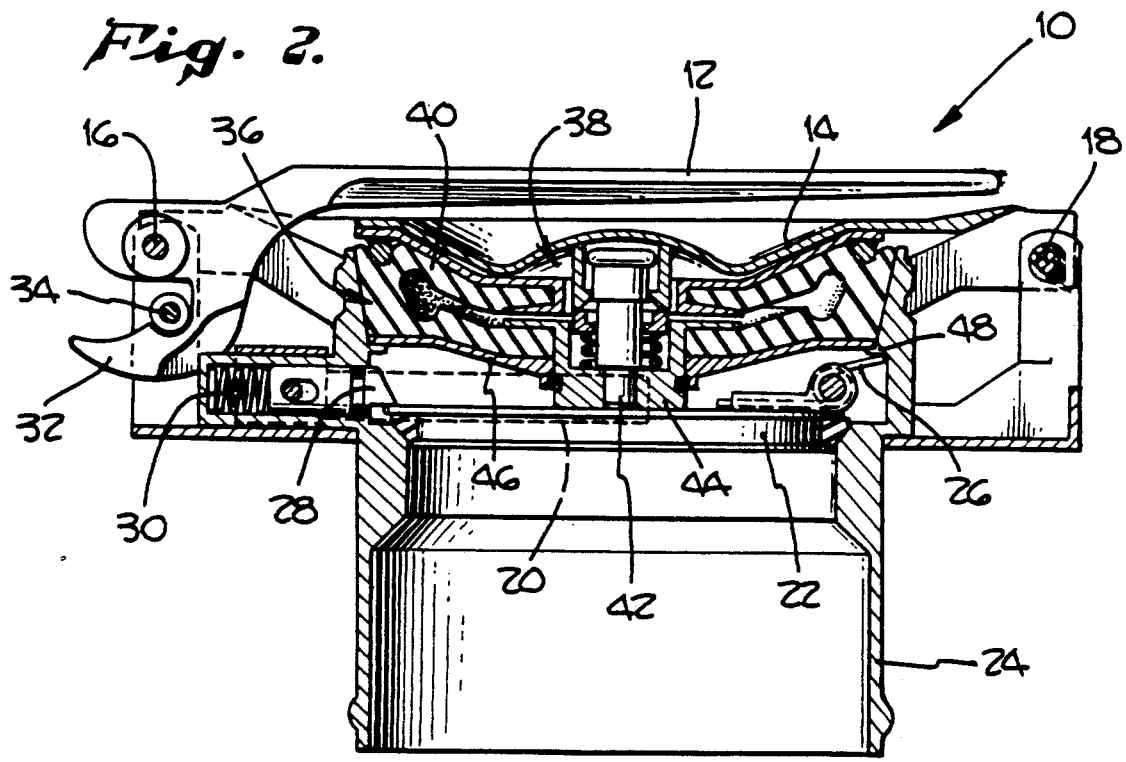
FIG. 2 is a cross section of the assembly of FIG. 1.

Turning first to FIGS. 1 and 2, there is shown an improved access port sealing device 10 that is incorporated in an externally operated lavatory drain assembly for aircraft. FIG. 1 is a view of the combination as seen by a servicing technician prior to utilizing the device 10. The combination includes a latching handle 12 which secures an upper plug supporting cover 14 that protects the present invention. The latching handle 12 is pivotally mounted on a first pin 16 and the upper supporting cover 14 is pivotally mounted on a second pin 18 at the opposite side of the access port.

If the latching handle 12 is not secured, the upper supporting cover 14 will be open and the aircraft will not be flight ready. A spring loaded actuating lever 20 is connected to a pivotally mounted sealing flap 22 which seats in the mouth of a conduit 24 that leads to the aircraft waste tank (not shown). A torsion spring 26 tends to rotate the flap 22 to the open position.

A locking tab 28 is coupled to a latching assembly (best seen in FIG. 2) that holds the sealing flap 22 in a closed and sealed configuration. A locking bias spring 30 keeps the locking tab 28 in the latched position, thereby retaining the sealing flap 22 in a closed and locked condition until released by manual operation of the locking tab 28.

The latching handle 12 includes a hook portion 32 which engages a rod 34. Rotating the latching handle 12 with the hook portion 32 engaging the rod 34 provides an "over-center" action which firmly holds the handle 12 in the latched position until released by an operator.

As seen in FIGS. 2-4, a sealing plug 36 is mounted to the upper supporting cover 14. The sealing plug 36 includes a central core mechanism 38 and an elastomeric sealing element 40 of generally toroidal shape, with a ribbed circumferential sealing surface similar to that shown and described in the patent to Ast, supra. The core mechanism 38 has a central pin 42 that includes a central hub or nose element 44 that is adapted to engage the exterior surface of the sealing flap 22. When the nose element 44 is forced to telescope inwardly by engagement with the sealing flap 22, the mechanism axially compresses the sealing element 40, expanding it radially outward, thereby seating it against the interior wall of the conduit 24 in a fluid tight seal.

A lower supporting plate 46 is carried on the central pin 42 which can, in one embodiment, seat against a ridge 48 on the inner wall of the conduit 24. The nose element 44 also exerts a further sealing force on the sealing flap 22, causing the latching tab 28 to retract and extend, holding the flap 22 in the sealed and latched condition.

The conduit 24 includes a "nipple" 50 which is specially configured to receive a servicing coupling/hose assembly (not shown). The servicing coupling/hose assembly is attached after the cover 14 has been opened but before the sealing flap 22 has been released.

In operation, the closed assembly 10 is utilized by first rotating the handle 12 in the counterclockwise direction as shown in FIGS. 2. The hook 32 is disengaged from the rod 34 and the handle and cover 14 rotate as a unit about the second pin 18 in the clockwise direction. As the cover rotates, the compressive forces on the plug 36 are relieved and the sealing element 40 can be withdrawn from the interior of the conduit 24.

The conical shape of the mouth of the conduit 24 facilitates withdrawal of the cover 12 and the attached plug 36. A servicing coupling/hose can be attached to the nipple 50 of the conduit 24 while the sealing flap 22 is still latched shut. When the hose is in place, the actuating lever 20 is depressed which operates the locking tab 28, moving it to the left and releasing the sealing flap 22.

Once free, the sealing flap 22 rotates in the clockwise direction under the influence of its torsion spring 26, which releases any waste materials that may be in the waste line from the main waste tank. At this point, the waste tank dump valve is opened, permitting the contents of the waste tank to enter the conduit 24 and into the servicing coupling/hose assembly.

When the servicing operation is completed, the servicing coupling/hose assembly is uncoupled from the nipple 50 and removed. The cover 14 is then rotated in the counterclockwise direction. The actuating element 44 engages the sealing flap 22 and causes it to rotate as well. As the cover 14 is closed, the sealing flap 22 is forced to close, as well. The conical interior wall at the mouth of the conduit 24 facilitates entry of the plug 36.

To complete the closure of the cover 14, the hook 32 of the latching handle 12 must engage the rod 34 and the latching handle must be rotated in the clockwise direction. This has the effect of adding additional force to the cover 14, the plug 36 and the nose element 44 which bears against the sealing flap 22. As the sealing flap 22 closes, the locking tab 28 is engaged and forced to the left against its bias spring 30, returning to secure the sealing flap 22 once the flap 22 is firmly seated in the conduit 24 opening.

The lower plate 46 engages the ridge 48 and, as the assembly is forced inward under the influence of the rotation of the latching handle 12, the lower plate 46 is forced upward to compress the sealing element 40, which is now fully inserted into the conical mouth of the conduit 24. The compressive forces on the sealing element 40 cause it to expand radially into a sealing engagement with the inner wall of the conduit 24.

As the latching handle 12 continues its travel, the rod 34 encounters a locking recess adjacent the hook 32 portion and the inward forces are relieved, slightly. The cover 12 is securely in place holding the plug 36 firmly sealed against the interior of the conduit 24 while the sealing flap 22 is held by its locking tab 28.

Turning next to FIGS. 3 and 4, the view shows the operation of the plug assembly 36, from the open configuration FIG. 3 to the closed configuration FIG. 4. As can be seen, the sealing element 40 is a hollow elastomer of toroidal shape. which is held in place by the lower plate 46 and an upper support plate 52. In a preferred embodiment, the sealing element 40 has three circumferential lands 41 separated by two circumferential grooves 43. The upper plate 52 includes a guide ring 54 on the surface adjacent the sealing element 40 to retain the radial orientation of the sealing element 40. The sealing element includes a groove 56 to receive the guide ring 54.

The upper plate 52 includes a u-shaped flange 58 into which the inner circumference of the upper half of the sealing element 40 is retained. A similar, u-shaped retaining flange is created between the lower plate 46 and the nose element 44 to hold the inner circumference of the lower half of the sealing element 40. The lower support plate 46 is held in place on the nose element 44 by a suitable retaining ring.

An expander spring 62 is seated between the inner surface of the nose element 44 and a spring washer 64. A central spindle 66 is seated in the nose element 44 and includes a cap 68 which is held in an upper chamber 70 in the lower surface of the cover 14.

As can be seen from FIG. 4, the OPEN position, the expander spring 62 is at its full length which biases the lower support plate 46 to its downward or rest location. The guide washer is held against the base of the cap 68 and the head of the cap 68 rests in the bottom of the upper chamber 70. The upper support plate 52 rests upon the surface of the sealing element 40 and no axial compression is imparted to the sealing element, leaving it at its minimal radial configuration which enables it to easily enter the interior of the nipple 50.

To effect a seal, the plug assembly 36 is brought into the interior of the nipple 50 and as the assembly moves downward, the lower support plate 46 rests upon the flange 48. As the cover 14 continues downward, the lower support plate 46 is held in place bringing an upward axial force on the lower radial surface of the sealing member 40. Initially, the upward motion will be transmitted to the upper plate 52 which is free to move until it encounters the inner surface of the cover 14.

If the nose element 44 has encountered the sealing flap 22, then it will resist further downward movement of the cover 14 and will move the expander spring 62 against the guide washer 64. After the guide washer 64 seats against the base of the upper chamber 70, any further movement compresses the expander spring 62. Additional motion is permitted as the central spindle 66 rises into the upper chamber 70. Continued downward motion of the cover 14 compresses the sealing element 40 between the upper and lower plates 52, 46, squeezing the sealing element radially outward into engagement with the inner wall of the nipple 50 and compressing the circumferential lands 41.

Figure 5:
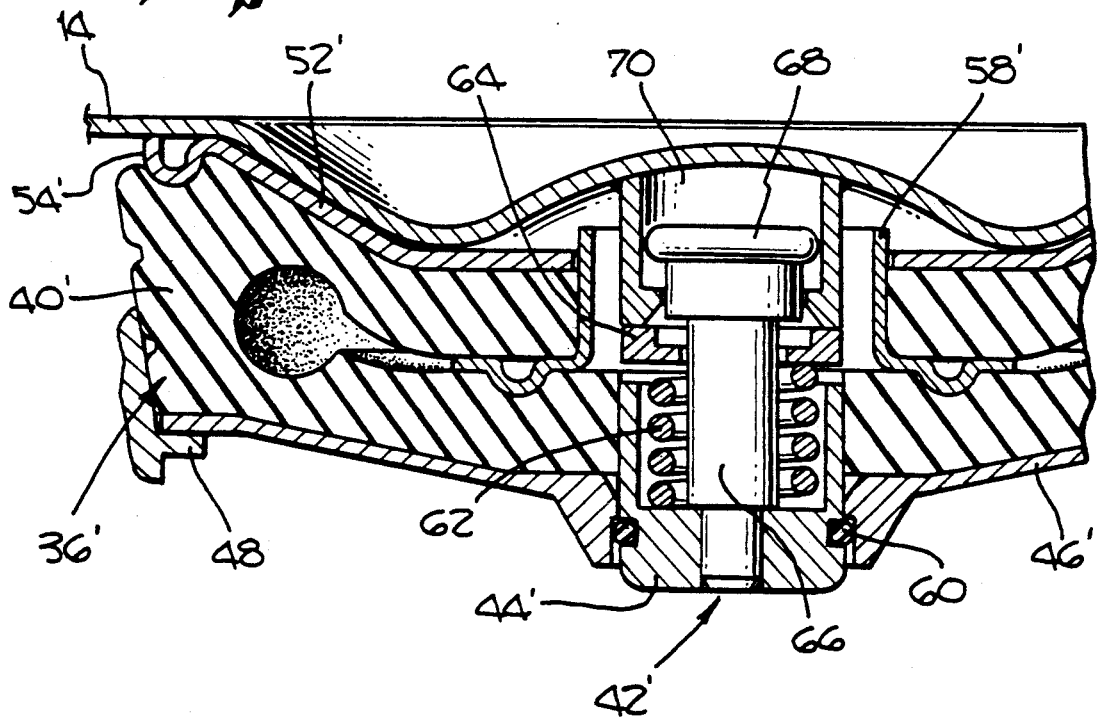
FIG. 5 is a detailed composite view of the plug assembly of the present invention according to an alternative embodiment in the open configuration.
Figure 6:
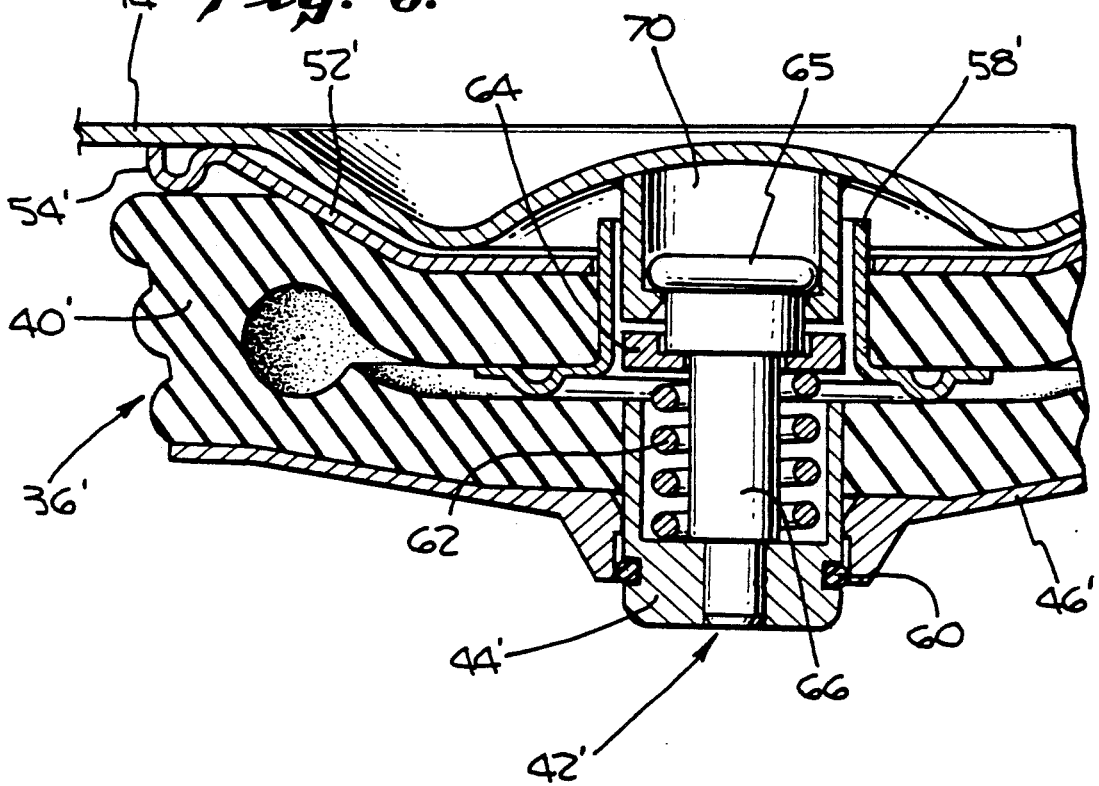
FIG. 6 is a detailed composite view of the plug assembly of the present invention according to an alternative embodiment in the closed configuration.

In FIGS. 5-6, an alternative embodiment of the expanding plug is shown in open and closed configurations, similar to the showing of FIGS. 3-4. In the following description, the identical parts will utilize the same reference numerals while similar parts will be designated by a primed reference numeral.

As can be seen from a comparison between FIGS. 3-4 and 5-6 the structures are essentially similar. However the sealing element 40' and its support structure has been modified as shown. The interior of the sealing element 40' has a narrower opening, terminating in a somewhat smaller, but more circular open ring near the periphery. To support such a structure, the upper support plate 52' has been modified to replace the u-shaped flange 58 of FIGS. 3-4 with a separate, flanged cylinder 58' which limits the axial compressibility of the sealing element 40' and redirects more of the force into the radial direction.

Similarly, the upper support plate 52' has an integral bend 54' near the outer periphery which supplants the guide ring 54 of FIGS. 3-4. The hub 44' has also been modified to eliminate the flange portion which extends into the central area of the sealing element 40', simplifying the assembly and disassembly of the plug 36'.

As in the embodiment of FIGS. 3-4, when the plug 36' seats in the opening of the nipple 50, downward motion of the cover 14 first engages the lower plate 46' with the ridge 48. This causes the lower and upper support plates 46', 52' to ride on the central core 38 until the upper plate 52' seats against the under surface of the cover 14. The action of the nose element 44' is then primarily limited to the closure of the sealing flap 22 and is substantially independent of the axial compression of the sealing element 40' and its radial expansion to occlude the interior of the nipple 50.

Thus there has been shown and described an improved waste drain servicing access port cover with an integral sealing element to prevent leakage to the exterior of the aircraft. The integral sealing element will adequately seal the drain line whether or not a interior sealing flap is in place and whether or not the waste drain valve is properly seated and preventing fluid flow into the waste drain conduit.

In the preferred embodiment, an inner sealing flap acts as an initial seal and the plug attached to a cover acts as the final seal. A remote actuator permits the inner sealing flap to remain closed until a servicing coupling/hose can be connected to a nipple fitting.

When servicing is complete and the servicing coupling/hose is removed, the cover is closed which action causes the inner sealing flap to latch while a sealing plug is axially compressed, causing it to expand radially into sealing engagement with the inner wall of the waste drain conduit. All parts are connected and there are no loose parts to be separated or lost from the assembly during servicing.

Other modifications and alternatives will occur to those skilled in the arts to which the present invention relates and the scope of the invention should be limited only by the scope of the claims appended hereto.

What is claimed as new is:

1. A cap assembly for sealing an access port to a conduit having an inner wall comprising:
    a) an outer cover mounted on the access port and adapted to pivot between an open position and a closed position;
    b) a sealing plug loosely mounted on the inner surface of said outer cover and adapted to fit within the conduit;
    c) an inner cover mounted within the conduit and adapted to pivot between an open position and a closed position; and
    d) actuating means on said outer cover adapted to axially compress said sealing plug for radially extruding said plug into sealing engagement with the conduit interior and for holding said inner cover in the closed position.
        said actuating means being adapted to close said inner cover when said outer cover is pivoted to the closed position, said sealing plug expanding radially under axial compression to form a fluid tight seal against the inner wall of the conduit.

2. A cap assembly as in claim 1, above, further including inner cover latching means for locking said inner cover in the closed position, said latching means including a lever assembly coupled to said latching means for releasing said latching means to allow said inner cover to open, said lever assembly being located on the exterior of the access port, whereby said inner cover can be opened independently of and subsequent to the opening of the outer cover.

3. A cap assembly as in claim 1, above, wherein said sealing plug includes an elastomeric sealing member adapted to sealingly occlude the conduit when expanded radially.

4. A cap assembly as in claim 3, above, wherein said sealing member includes at least two circumferential lands separated by a circumferential groove.

5. A cap assembly as in claim 3, above, wherein said sealing member includes three circumferential lands separated by circumferential grooves.

6. A cap assembly as in claim 3, above, wherein said sealing plug includes sealing member compressing means adapted to cooperate with a ridge on the inner wall of the conduit for extruding said sealing member radially into sealing engagement with the conduit inner wall.

7. A cap assembly as in claim 1, above, wherein said sealing plug includes:
    a) an elastomeric sealing member;

b) a central core element supporting said sealing member, said core element being adapted to engage said inner cover to hold it closed and sealed; and c) a first compression plate on said central core element adjacent said sealing member and adapted to cooperate with a ridge on the inner surface of the conduit for compressing said sealing member, causing said member to extrude radially into sealing contact with the inner wall of the conduit.

8. A cap assembly as in claim 7, above, wherein said central core element further includes a telescoping plunger element and a bias spring tending to urge said plunger outward for releasing compressive forces on said sealing member to permit radial contraction, thereby facilitating removal of said sealing member from the conduit.

9. A cap assembly as in claim 7, above, further including a second compression plate mounted on said central core element between said sealing member and said outer cover for cooperating with said first compression plate to extrude said sealing member radially therebetween.

10. A cap assembly as in claim 9, above, wherein said sealing member includes at least two circumferential lands separated by a circumferential groove, said lands being capable of expanding axially into said grooves during sealing engagement with the conduit caused by radial extrusion of said sealing member.

11. In a cap assembly for sealing an access port to a conduit having an inner wall, including an outer cover adapted to pivot between open and closed positions, and further including a latching lever assembly adapted to engage the access port for locking the outer cover in the closed position, the improvement comprising:

a) a sealing plug connected to the interior of the outer cover and adapted to fit into the interior of the conduit;

b) plug expanding means operable in response to axial compressive forces for extruding said sealing plug radially into sealing engagement with the inner wall of the conduit; and c) actuating means cooperating with the latching lever assembly and the conduit for applying axial compressive forces to said plug expanding means, whereby closing the outer cover inserts said sealing plug into the conduit and operation of the latching lever assembly to lock the cover in place also operates to provide a fluid tight seal of the conduit.

12. The cap assembly of claim 11, above, further including an inner cover and inner cover latching means for locking said inner cover in the closed position, said latching means including a lever assembly coupled to said latching means for releasing said latching means to allow said inner cover to open, said lever assembly being located on the exterior of the access port, whereby said inner cover can be opened independently of and subsequent to the opening of the outer cover.

13. The cap assembly of claim 12, above, wherein said lever assembly operates bidirectionally, thereby simplifying its operation.

14. The cap assembly of claim 11, above, wherein said sealing plug includes an elastomeric sealing member adapted to sealingly occlude the conduit when expanded radially.

15. The cap assembly of claim 14, above, wherein said sealing member includes at least two circumferential lands separated by a circumferential groove.

16. The cap assembly of claim 14, above, wherein said sealing member includes three circumferential lands separated by circumferential grooves.

17. A cap assembly as in claim 14, above, wherein said plug expanding means include sealing member compressing means adapted to cooperate with a ridge on the inner wall of the conduit for extruding said sealing member radially into sealing engagement with the conduit inner wall.

18. A cap assembly as in claim 11, above, wherein said sealing plug includes an elastomeric sealing member, and said plug expanding means include a central core element supporting said sealing member, said core element adapted to engage said inner cover to hold it closed and sealed, and a first compression plate on said core element adjacent said sealing member and adapted to cooperate with a ridge on the inner wall of the conduit for compressing said sealing member, causing said member to extrude radially into sealing contact with the interior wall of the conduit.

19. A cap assembly as in claim 18, above, wherein said central core element further includes a telescoping plunger element and a bias spring tending to urge said plunger outward for releasing compressive forces on said sealing member to permit radial contraction, thereby facilitating removal of said sealing member from the conduit.

20. A cap assembly as in claim 18, above, wherein said plug expanding means further includes a second compression plate mounted on said central core element between said sealing member and said outer cover for cooperating with said first compression plate to extrude said sealing member radially therebetween.

21. A cap assembly as in claim 20, above, wherein said sealing member includes at least two circumferential lands separated by a circumferential groove, said lands being capable of expanding axially into said grooves during sealing engagement with the conduit caused by radial extrusion of said sealing member.

* * * * *